US012599920B2

(12) United States Patent
Liu et al.

(10) Patent No.: US 12,599,920 B2
(45) Date of Patent: Apr. 14, 2026

(54) HAND-HELD WIRELESS ELECTRIC SPRAYER

(71) Applicant: Zhejiang Luiswell Technology Co., Ltd, Ningbo (CN)

(72) Inventors: Peng Liu, Ningbo (CN); Xiaofei Lu, Ningbo (CN)

(73) Assignee: NINGBO LUISWELL TOOLS CO., LTD., Ningbo (CN)

( * ) Notice: Subject to any disclaimer, the term of this patent is extended or adjusted under 35 U.S.C. 154(b) by 528 days.

(21) Appl. No.: 18/079,038

(22) Filed: Dec. 12, 2022

(65) Prior Publication Data

US 2024/0033759 A1 Feb. 1, 2024

(30) Foreign Application Priority Data

Jul. 29, 2022 (CN) ......................... 202221985838.7

(51) Int. Cl.
*B05B 9/08* (2006.01)

(52) U.S. Cl.
CPC .................................. *B05B 9/0861* (2013.01)

(58) Field of Classification Search
CPC .............................. B05B 12/14; B05B 9/0861
USPC ................................................. 239/165, 357
See application file for complete search history.

(56) References Cited

U.S. PATENT DOCUMENTS 1,140,453 A * 5/1915 Frank .................. B05B 11/1015 43/900
2,647,796 A * 8/1953 Ziherl ................... B05B 1/3442 239/491
2,784,876 A * 3/1957 Parkes ...................... B60S 1/50 239/284.1
3,120,347 A * 2/1964 Duke, Jr. .............. B05B 9/0861 239/332
3,173,584 A * 3/1965 Giavasis .............. B67D 1/0425 222/404
3,581,997 A * 6/1971 Stevenson ............. B05B 9/0861 239/332
3,901,449 A * 8/1975 Bochmann ............ B05B 9/0861 239/587.2
7,971,803 B1 * 7/2011 Barlowe ............... B05B 9/0816 239/525

* cited by examiner

*Primary Examiner* — Chee-Chong Lee
(74) *Attorney, Agent, or Firm* — Jose Cherson Weissbrot

(57) ABSTRACT

A hand-held wireless electric sprayer includes a shell formed by assembling an upper shell and a lower shell, a pump and a battery installed inside the shell, a switch mechanism for controlling the pump to be turned on and off, a liquid inlet pipe communicated with the pump and extending to the outside of the shell, and a spray nozzle communicated with the pump, wherein an outer end of the spray nozzle is provided with a nozzle, the lower shell is provided with a chute integrally formed inward, and an inner end of the spray nozzle is fixedly connected with a slide block; the slide block slides in the chute to realize the length adjustment of the nozzle, the nozzle is connected with the pump by a connecting pipe, an inner wall of the chute is provided with ribs, and the limiting effect of the ribs and the slide block enables the nozzle to stay at a set position; a length of the nozzle extending out of the shell can be adjusted, and the nozzle can reach a stable state by the action of the ribs, which is convenient for users to reach a comfortable state during spraying and convenient for storage.

5 Claims, 10 Drawing Sheets

HAND-HELD WIRELESS ELECTRIC SPRAYER

TECHNICAL FIELD

The present application relates to a hand-held wireless electric sprayer.

BACKGROUND

Sprayer is a kind of agricultural equipment used for spraying operation. Hand-held wireless electric sprayer is loved by consumers because of its portability of use, carrying and storage. Hand-held wireless electric sprayer generally includes a shell with a pump and a battery built in it. The pump forms a communication waterway between the liquid inlet pipe and the nozzle, and the liquid transported by the pump is atomized and sprayed by the nozzle at the free end of the nozzle.

In the existing hand-held wireless electric sprayer, the nozzle is a rigid metal tube, and the nozzle is generally directly and fixedly connected with the shell, so that the whole storage length of the sprayer is large, and in the spraying operation process, the adjustment of the spraying angle and position also has certain inconvenience; in addition, the work of the pump is controlled by the switch, but in fact, when the switch controls the pump to stop, the stop of the pump is lagging behind, resulting in a short-term dripping phenomenon when the nozzle is stopped, and the user's product experience is not good.

SUMMARY

In view of the shortcomings of the above problems, the present application provides a hand-held wireless electric sprayer.

In order to achieve the above purpose, the present application provides a hand-held wireless electric sprayer, which includes a shell formed by assembling an upper shell and a lower shell, a pump and a battery installed inside the shell, a switch mechanism for controlling the pump to be turned on and off, and a liquid inlet pipe communicated with the pump and extending to the outside of the shell, and a spray nozzle communicated with the pump, wherein an outer end of the spray nozzle is provided with a nozzle; the lower shell is provided with a chute integrally formed inward, and an inner end of the spray nozzle is fixedly connected with a slide block; the slide block slides in the chute to realize the length adjustment of the nozzle; the nozzle is connected with the pump by a connecting pipe, an inner wall of the chute is provided with ribs, and the limiting effect of the ribs and the slide block enables the nozzle to stay at a set position.

The length of the nozzle extending out of the shell can be adjusted, and the nozzle can reach a stable state by the action of the ribs, which is convenient for users to reach a comfortable state during spraying and convenient for storage.

As a further improvement of the solution, the slide block has a connecting hole for the nozzle to be plugged in, and a connector that can be inserted into the connecting pipe, and the connecting hole and the connector form internal communication;

in the technical solution, the slide block can slide and guide the nozzle to adjust its length, and at the same time, it can also be used as an intermediate connector between the nozzle and the connecting pipe, so that the connection between the nozzle and the connecting pipe becomes convenient and the assembly is simplified.

As a further improvement of the solution, there are two ribs, which are close to the two ends of the chute respectively, and the distance between the ribs and the ends of the chute is matched with the length of the slide block;

in the above technical solution, the position of the slide block is limited to two ribs, and correspondingly, the nozzle only has a fully extended state and a fully contracted state.

As a further improvement of the solution, the switch mechanism comprises a toggle switch and a microswitch, wherein the microswitch is arranged in the shell, the toggle switch is arranged on the joint surface of the upper shell and the lower shell, the microswitch is electrically connected with the pump and the battery, and the toggle switch switches positions by toggling, thereby driving the microswitch to control the pump;

in the technical solution, the toggle switch is arranged on the joint surface, and the toggle switch drives the microswitch to realize the control of the pump, so that the microswitch has higher sensitivity and better product experience.

As a further improvement of the solution, the battery comprises a charging port arranged on the surface of the shell, a circuit board arranged inside the shell, an indicator lamp arranged on the circuit board, and a transparent cover arranged on the shell at the position corresponding to the indicator lamp;

in the technical solution, the charging port is convenient for charging the battery, and the transparent cover is convenient for naked eyes to directly observe the battery power condition and the working condition of the pump of the hand-held wireless electric sprayer.

As a further improvement of the solution, the connecting pipe is provided with a valve control assembly near the connecting end of the pump, and the valve control assembly comprises a fixed valve seat and a slidable valve core arranged in the valve seat, wherein the valve seat has two connecting ends connected with the connecting pipe, and the valve core can realize dredging and blocking of the waterway by sliding in the valve seat, and the sliding of the valve core is synchronized with the toggle switch;

in the technical solution, when the toggle switch switches off the pump, the valve seat is blocked by the movement of the valve core synchronized with the toggle switch, the waterway is completely cut off, the nozzle of the spray nozzle has no dripping, and the product experience is good.

As a further improvement of the solution, the valve core is provided with a jack, and the toggle switch is provided with an insert piece matched with the jack;

in the technical solution, the insert is inserted into the jack, and synchronous movement is formed through the direct connection of the mechanical structure, so that the structure is simple and reliable.

Compared with the prior art, the present application has the beneficial effects that the length of the nozzle extending out of the shell is adjustable, and the nozzle can reach a stable state under the action of the ribs, which is convenient for users to reach a comfortable state during spraying and convenient for storage; a valve control assembly is arranged on the pipe, and the movement of the valve core of the valve control assembly keeps synchronization with the toggle switch, that is, the toggle switch controls the pump and also controls the unblocking of the waterway. When the sprayer is stopped, the waterway is blocked at the same time, and no dripping occurs at the nozzle of the spray nozzle.

Figure 1:
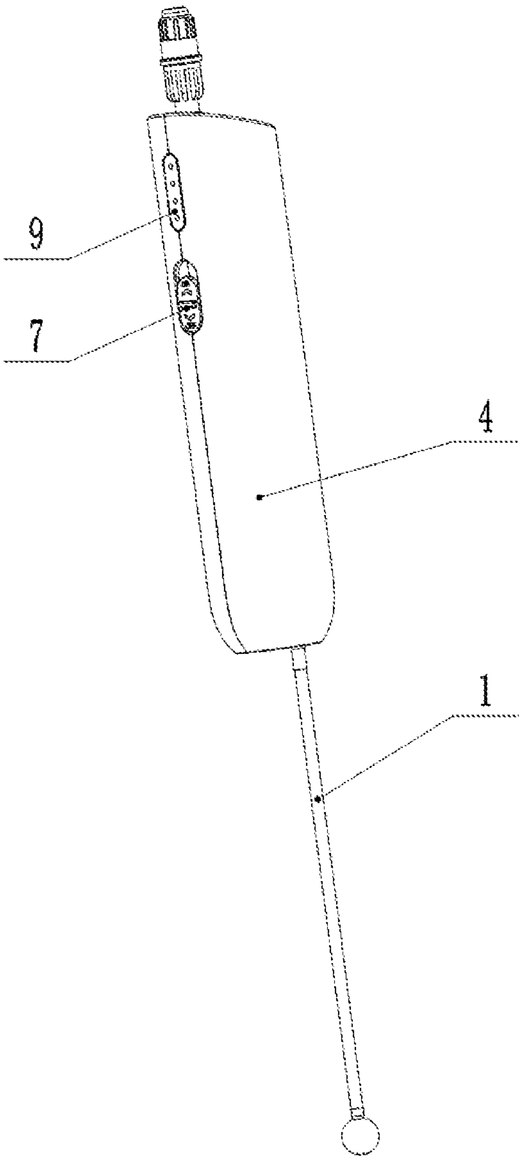
FIG. 1 is a perspective view of a hand-held wireless electric sprayer according to the present application.
Figure 2:
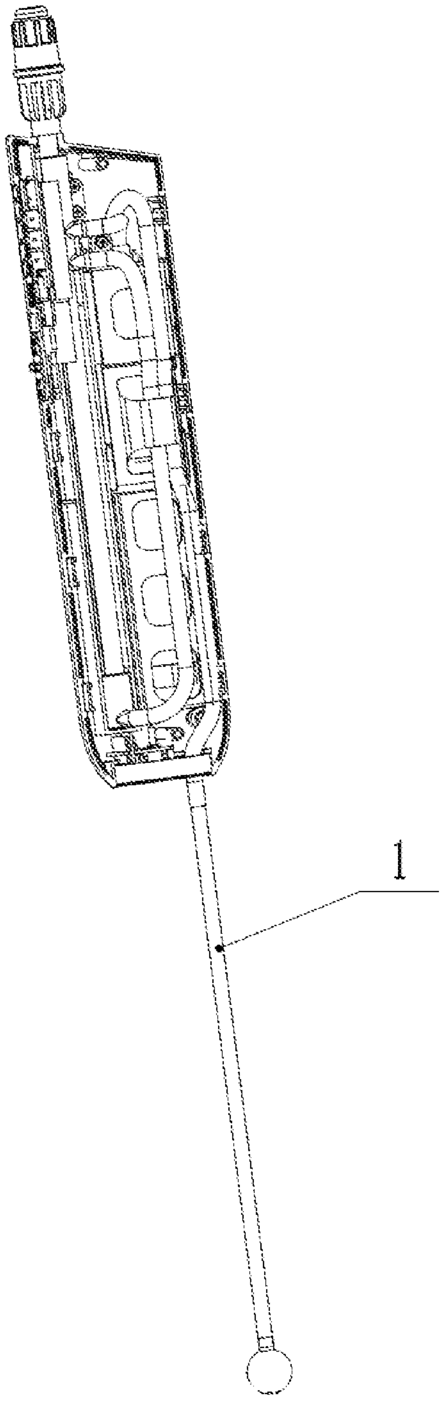
FIG. 2 is a schematic diagram of FIG. 1 after the upper shell is hidden.

In the figures: 1. Liquid inlet pipe; 2. Pump; 3. Slide block; 31. Connecting hole; 32. Connector; 4. Shell; 41. Upper shell; 42. Lower shell; 41. Chute; 42. Rib; 5. Spray nozzle; 6. Connecting pipe; 7. Toggle switch; 71. Insert; 8. Microswitch; 9. Transparent cover; 10. Circuit board; 11. Valve control assembly; 111. Valve seat; 112. Valve core; 1121, Jack.

DESCRIPTION OF EMBODIMENTS

As shown in FIGS. 1-4, a hand-held wireless electric sprayer according to the embodiment of the present application includes a shell 4 formed by assembling an upper shell 41 and a lower shell 42, a pump 2 and a battery installed inside the shell 4, a switch mechanism for controlling the pump 2 to turn on and off, a liquid inlet pipe 1 communicated with the pump 2 and extending to the outside of the shell 4, and a nozzle 5 communicated with the pump 2. The liquid inlet pipe 1 is generally a hose, and the water inlet end of the liquid inlet pipe 1 is generally provided with a filter. The outer end of the nozzle 5 is provided with a nozzle, the lower shell 42 has a chute 421 integrally formed inward, the inner end of the nozzle 5 is fixedly connected with a slide block 3, and the slide block 3 slides in the chute 421 to realize the length adjustment of the nozzle 5. The nozzle 5 is connected with the pump 2 by a connecting pipe 6, and ribs 422 are formed on the inner wall of the chute 421. The limiting effect of the ribs 422 and the slide block 3 makes the nozzle 5 stay at a set position. The connecting tube 6 is a hose to adapt to the length change of the slider 3 when it slides in the chute 421.

Figure 5:
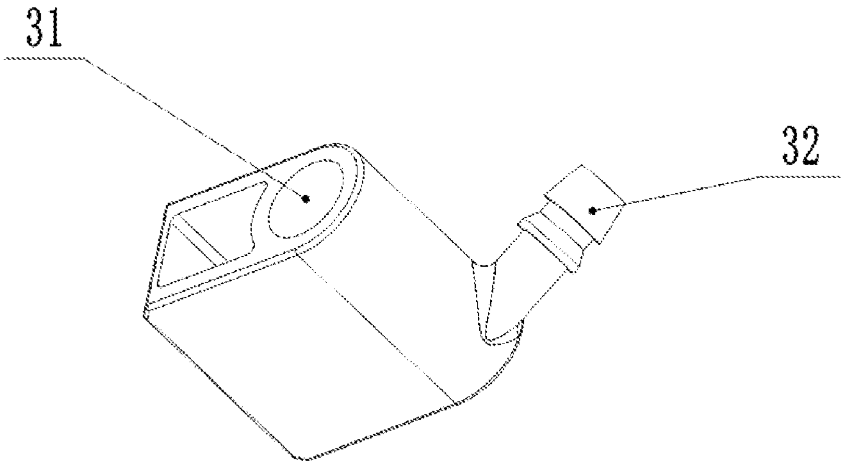
FIG. 5 is a schematic diagram of a slide block.

As shown in FIG. 5, the slide block 3 has a connecting hole 31 for the nozzle 5 to be plugged in, and a connector 32 that can be inserted into the connecting pipe 6. The connecting hole 32 and the connector 32 form internal communication. The slide block serves as a sliding guide to drive the nozzle to adjust its length, and also serves as an intermediate connector between the nozzle and the connecting pipe, so that the connection between the nozzle and the connecting pipe becomes convenient and the assembly is simplified.

Figure 4:
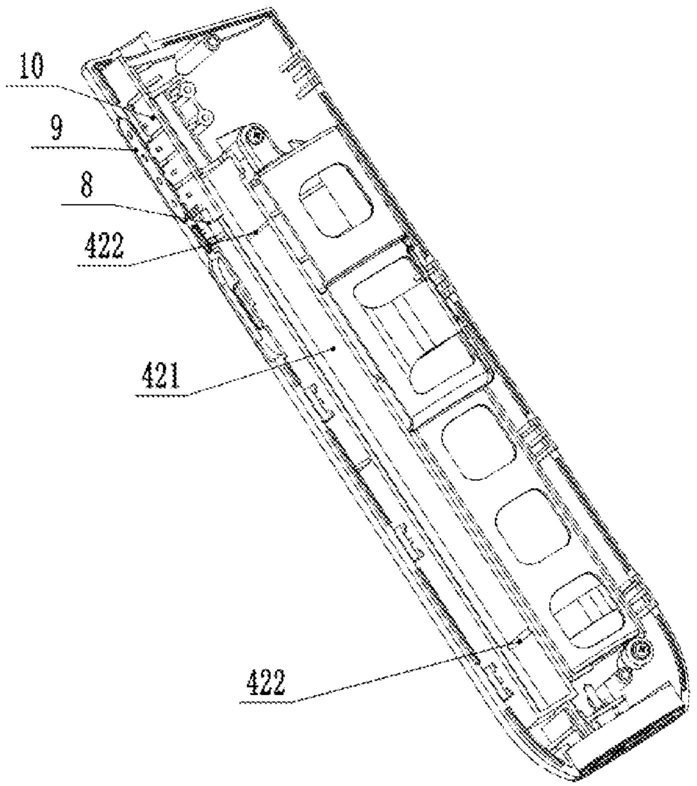
FIG. 4 is an enlarged view of the lower shell in FIG. 3.

As shown in FIG. 4, there are two ribs 422 near the two ends of the chute 421, respectively. The distance between the ribs 422 and the ends of the chute 421 matches the length of the slide block 3, and the position of the slide block is limited to two ribs. Correspondingly, the nozzle is only in a fully extended state and a fully contracted state.

Figure 3:
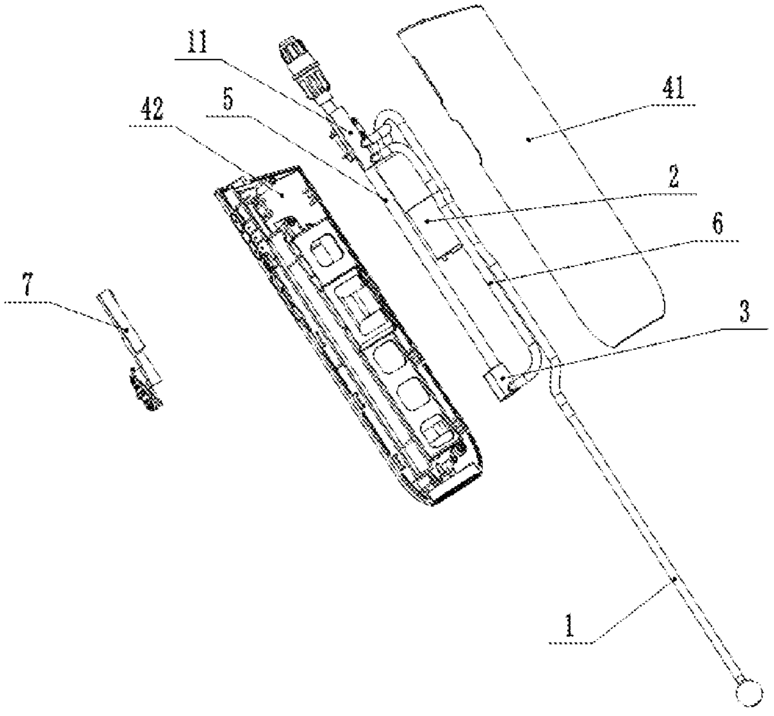
FIG. 3 is an explosion diagram of FIG. 1.

As shown in FIG. 3 and FIG. 4, the switch mechanism includes a toggle switch 7 and a microswitch 8. The microswitch 8 is arranged in the shell 4. The toggle switch 7 is arranged on the joint surface of the upper shell 41 and the lower shell 42. The microswitch 8 is electrically connected with the pump 2 and the battery. The toggle switch 7 switches the position by toggling, and then drives the microswitch 8 to control the pump 2. The toggle switch is arranged on the joint surface, and the microswitch is driven by the toggle switch to control the pump. The microswitch has higher sensitivity and better product experience.

As shown in FIG. 4, the battery includes a charging port arranged on the surface of the shell 4, and a circuit board 10 is arranged inside the shell 4, and an indicator lamp is arranged on the circuit board 10. The shell 4 is provided with a transparent cover 9 at the position corresponding to the indicator lamp. The charging port is convenient for charging the battery, and the transparent cover is convenient for naked eyes to directly observe the battery power status of the hand-held wireless electric sprayer and the working condition of the pump.

As shown in FIGS. 3, 7-9, the connecting pipe 6 is provided with a valve control assembly 11 near the connecting end of the pump 2. The valve control assembly 11 includes a fixed valve seat 111 and a slidable valve core 112 arranged in the valve seat 111. The valve seat 111 has two connecting ends connected with the connecting pipe 6, and the valve core 112 can realize dredging and blocking of the waterway by sliding in the valve seat 111, and the sliding of the valve core 112 is synchronized with the toggle switch 7.

Figure 6:
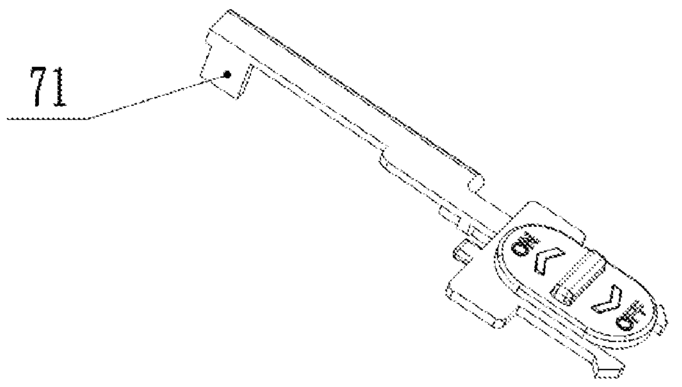
FIG. 6 is a schematic diagram of a toggle switch.
Figure 7:
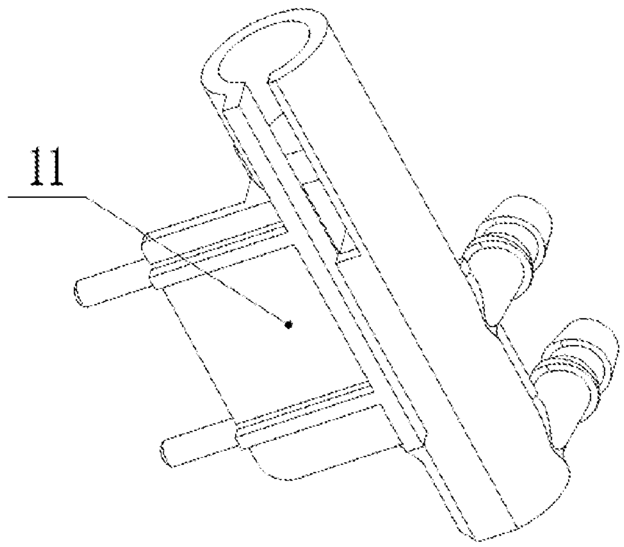
FIG. 7 is a schematic diagram of the valve control assembly.
Figure 8:
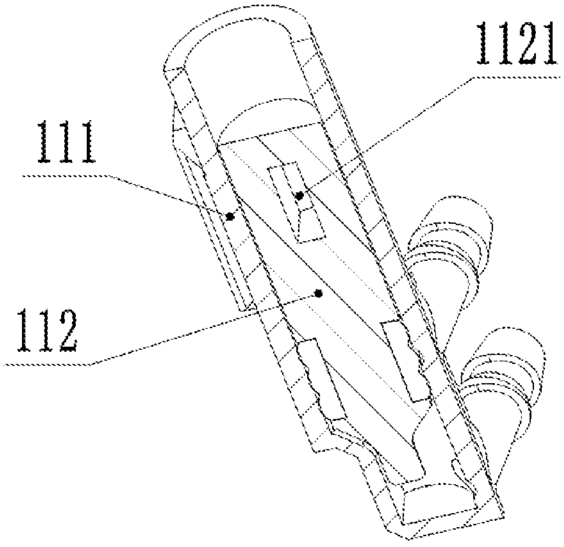
FIG. 8 is a sectional view of the valve control assembly.
Figure 9:
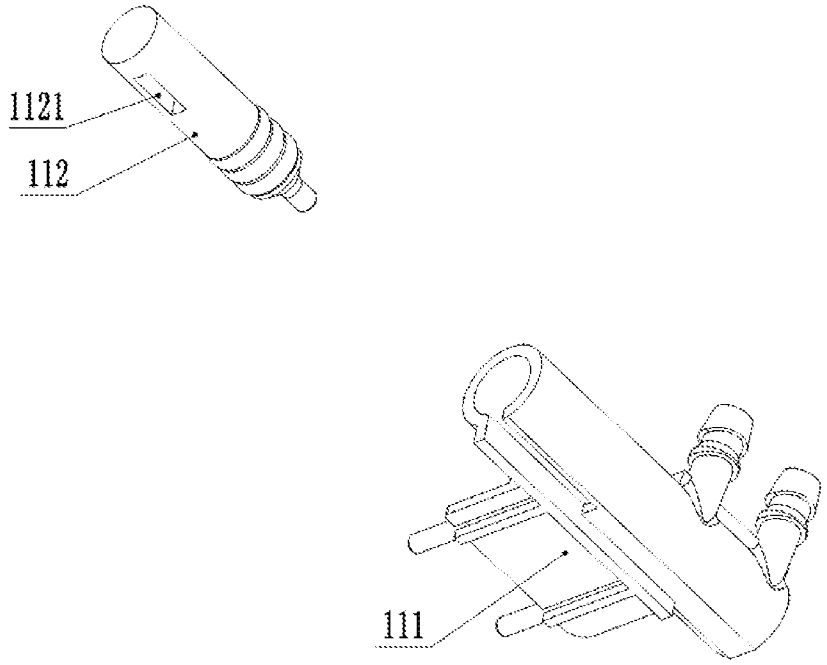
FIG. 9 is an explosion diagram of the valve control assembly.
Figure 10:
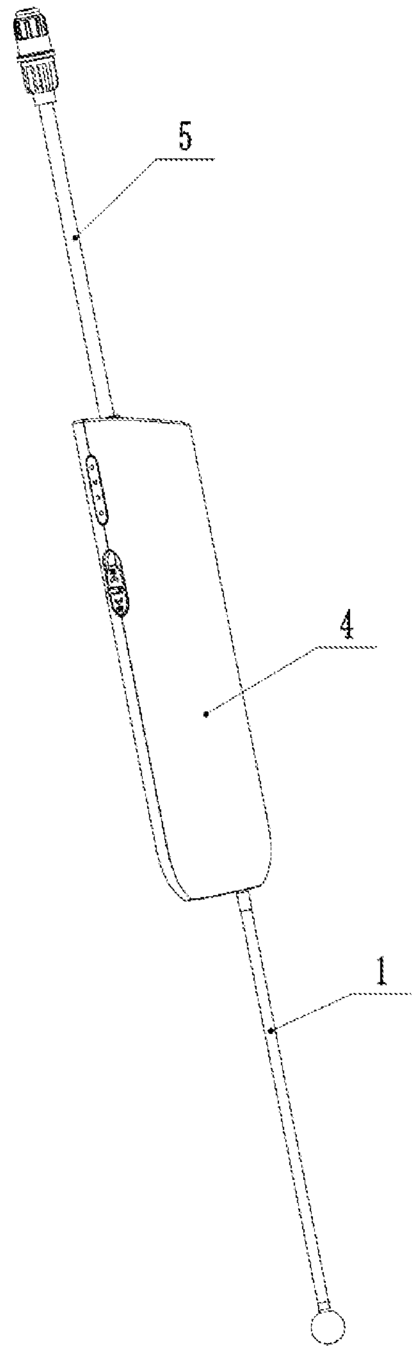
FIG. 10 is a perspective view of a hand-held wireless electric sprayer according to the present application (the nozzle is fully extended).

As shown in FIG. 6 and FIG. 9, the valve core 112 has a jack 1121, and the toggle switch 7 has an insert 71 matched with the jack 1121. The insert is inserted into the jack and moves synchronously through direct connection of mechanical structure, so the structure is simple and reliable.

The length of the nozzle extending out of the shell can be adjusted, and the nozzle can reach a stable state by the action of the ribs, which is convenient for users to reach a comfortable state during spraying and convenient for storage; a valve control assembly is arranged on the pipe, and the movement of the valve core of the valve control assembly keeps pace with the toggle switch, that is, the toggle switch controls the pump and also controls the dredging and blocking of the waterway. When the sprayer is stopped, the waterway is blocked at the same time, and no dripping occurs at the nozzle of the spray nozzle.

When in operation, the liquid enters the pump 2 from the liquid inlet pipe 1, and the pump 2 works so that the liquid reaches the nozzle 5 through the connecting pipe 6 (the connecting pipe 6 is provided with the valve control assembly 11) and the slide block 3 in turn, and is atomized and sprayed by the nozzle at the free end of the nozzle 5.

The above is only the preferred embodiment of the present application, and it is not intended to limit the present application. For those skilled in the art, the present application can be modified and varied. Any modification, equivalent substitution, improvement, etc. made within the spirit and principle of the present application shall be included in the scope of protection of the present application.

What is claimed is:

1. An electric sprayer, comprising:

a shell formed by assembling an upper shell and a lower shell;

a pump and a battery installed inside the shell;

a switch mechanism for controlling the pump to be turned on and off, the switch mechanism having a toggle switch and a microswitch, wherein the microswitch is smaller than the toggle switch;

a liquid inlet pipe communicated with the pump and the liquid inlet pipe extends outside of the shell; and a spray nozzle communicated with the pump, wherein an outer end of the spray nozzle is provided with a nozzle; the lower shell is provided with a chute integrally formed inward, and an inner end of the spray nozzle is fixedly connected with a slide block; the slide block slides in the chute to realize the length adjustment of the nozzle, an inner wall of the chute is provided with at least two ribs with limiting effect, the limiting effect of the at least two ribs and the slide block enables the nozzle to stay at a set position; the nozzle is connected with the pump by a connecting pipe, wherein the connecting pipe is provided outside the pump body with a valve control assembly at a connecting end near the pump, and the valve control assembly comprises a fixed valve seat and a slidable valve core arranged in the fixed valve seat, the fixed valve seat has two connecting ends connected with the connecting pipe;

the valve core has a jack, and the toggle switch has an insert matched with the jack, the insert and the jack being in direct mechanical engagement such that toggling of the toggle switch drives linear sliding of the slidable valve core within the fixed valve seat to open or block the waterway.

2. The electric sprayer according to claim 1, wherein the slide block has a connecting hole for the nozzle to plug in and a connector that can be inserted into the connecting pipe, and the connecting hole and the connector form internal communication.

3. The electric sprayer according to claim 1, wherein the at least two ribs, which are close to the two ends of the chute respectively, and a distance between the at least two ribs and the ends of the chute matches a length of the slide block.

4. The electric sprayer according to claim 1, wherein the microswitch is arranged in the shell, and the toggle switch is arranged on a joint surface of the upper shell and the lower shell; the microswitch is electrically connected with the pump and the battery, and the toggle switch switches positions by toggling, thereby driving the microswitch to control the pump.

5. The electric sprayer according to claim 4, wherein the battery comprises a charging port arranged on a surface of the shell, a circuit board is arranged inside the shell, an indicator lamp is arranged on the circuit board, and a transparent cover is arranged on the shell at a position corresponding to the indicator lamp.

* * * * *